United States Patent
Jonnalagadda et al.

[19]

[11] Patent Number: 6,046,775
[45] Date of Patent: Apr. 4, 2000

[54] RECOVERING DATA FROM A VESTIGIAL SIDEBAND OF A STANDARD TELEVISION SIGNAL

[75] Inventors: Krishnamurthy Jonnalagadda, Plainsboro; Liston Abbott, East Windsor; Edward Coley Fox, Cranbury, all of N.J.

[73] Assignee: Sarnoff Corporation, Princeton, N.J.

[21] Appl. No.: 08/937,826

[22] Filed: Sep. 25, 1997

[51] Int. Cl.$^7$ ...................................................... H04N 7/081
[52] U.S. Cl. ........................ 348/461; 348/465; 348/473; 348/725; 348/726; 348/706
[58] Field of Search ................... 348/461, 462, 348/465, 473, 726, 725, 705, 706; H04N 7/081

[56] References Cited

U.S. PATENT DOCUMENTS

| | | | |
|---|---|---|---|
| 4,450,477 | 5/1984 | Lovett ......................................... | 348/7 |
| 5,029,003 | 7/1991 | Jonnalagadda ........................... | 348/493 |
| 5,539,471 | 7/1996 | Myhrvold et al. ....................... | 348/473 |
| 5,621,471 | 4/1997 | Kim et al. ................................ | 348/473 |
| 5,646,698 | 7/1997 | Yang et al. ............................... | 348/475 |
| 5,666,168 | 9/1997 | Montgomery et al. ................. | 348/473 |
| 5,708,476 | 1/1998 | Myhrvold et al. ...................... | 348/473 |
| 5,731,841 | 3/1998 | Rosenbaum et al. ................... | 348/463 |
| 5,739,866 | 4/1998 | Kim et al. ................................ | 348/473 |

OTHER PUBLICATIONS

National Association of Broadcasters (NAB) submission of Dec. 17, 1996 entitled "D–Channel Signal Specification".
National Association of Broadcasters (NAB) submission of Apr. 30, 1994 entitled Response to RFP "NTSC–Compatible Data Broadcasting Systems".
National Association of Broadcastiers (NAB) submission of Jul. 3, 1996 entitled "Description of D–Channel Implementations".

*Primary Examiner*—John K. Peng
*Assistant Examiner*—Jean W. Désir
*Attorney, Agent, or Firm*—William J. Burke

[57] ABSTRACT

A method and apparatus for recovering an information carrier which has been transmitted as a sub-carrier in the lower VSB spectral region of a television signal. The invention utilizes a spectral inversion method to shift the data carrier frequency from the normal VSB spectral region to a spectral region normally associated with video information in a standard television signal. The data carrier is then recovered using a standard video demodulator and provided to a data utilization circuit, such as a QPSK demodulator.

17 Claims, 4 Drawing Sheets

RECOVERING DATA FROM A VESTIGIAL SIDEBAND OF A STANDARD TELEVISION SIGNAL

The invention relates to a method and apparatus for recovering a data carrier included within a vestigial sideband of a standard television signal.

BACKGROUND OF THE DISCLOSURE

Data may be transmitted as a sub-carrier in the lower vestigial sideband (VSB) spectral region of a standard television signal, e.g., a National Television Standards Committee (NTSC) broadcast video signal. Normally the standard television signal is generated by double sideband modulating a radio frequency (RF) or an intermediate frequency (IF) picture carrier with a baseband composite video signal and thereafter vestigial filtering the modulated signal to remove the majority of the lower sideband. The vestigial sideband, which nominally extends to 1.25 MHz below the picture carrier, contains low frequency luminance information. This low frequency luminance information within the vestigial sideband is duplicated by low frequency luminance information within the television signal extending from the picture carrier to 1.25 MHz above the picture carrier. It has been determined that a portion of the luminance information in the vestigial sideband may be replaced with auxiliary digital audio information or other information without significantly affecting the video signal recovered by a receiver. The other information may comprise e.g., a quadrature phase shift keying (QPSK) modulated data signal.

K. Jonnalagadda, in U.S. Pat. No. 5,029,003, discloses an apparatus for removing video signal from a portion of the vestigial sideband of a television signal and inserting a digital audio signal therein. Also disclosed is a receiver for recovering the digital audio signal from the television signal. The receiver contains standard picture processing circuitry including a video intermediate frequency (IF) circuit and standard sound processing circuitry including an audio IF circuit. The receiver also includes an auxiliary data processing circuit, including an auxiliary IF circuit, bandpass filter and digital demodulator for recovering the digital sound signal.

Unfortunately, the receiver disclosed in U.S. Pat. No. 5,029,003 requires an inordinate amount of circuitry to extract data from the vestigial sideband of a television signal.

Therefore, it is seen to be desirable to provide a receiver having the capability of retrieving data which has been transmitted as a sub-carrier in the lower VSB spectrum region of a data carrier without utilizing an inordinate amount of circuitry. Specifically, it is seen to be desirable to provide a television receiver which does not require an auxiliary IF circuit to recover data from the VSB region of a television signal.

SUMMARY OF THE INVENTION

The invention is a method and apparatus for recovering an information carrier which has been transmitted as a sub-carrier in the lower VSB spectral region of a television signal. The invention utilizes a spectral inversion method to shift the data carrier frequency from the normal VSB spectral region to a spectral region normally associated with video information in a standard television signal. The data carrier is then recovered using a standard video demodulator and provided to a data utilization circuit, such as a QPSK demodulator.

Specifically, an apparatus according to the invention includes a spectral inverter for spectrally inverting a television signal and a demodulator, coupled to the spectral inverter, for demodulating the spectrally inverted television signal to produce a baseband signal. Since the spectral inverter causes the data carrier to be located in spectral region normally associated with video information, a standard video demodulator may be used to recover the baseband data.

In another embodiment of the invention, a narrow band pass filter passes the lower VSB region and the picture carrier of a standard television IF signal to a standard video IF demodulator. The video IF demodulator produces a baseband signal comprising the information carrier and any data modulated onto the carrier. The information carrier is then utilized by an information processing circuit such as a QPSK demodulator.

It is desirable to fabricate the invention using low cost, "off the shelf" components, specifically components typically used in a conventional television receiver.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an NTSC broadcast television receiver. It will be apparent to one of ordinary skill in the art that the invention is also applicable to PAL and SECAM systems. Moreover, the source of the television signals (i.e., broadcast, cable, MMDS and the like) is immaterial to the invention.

Figure 3:
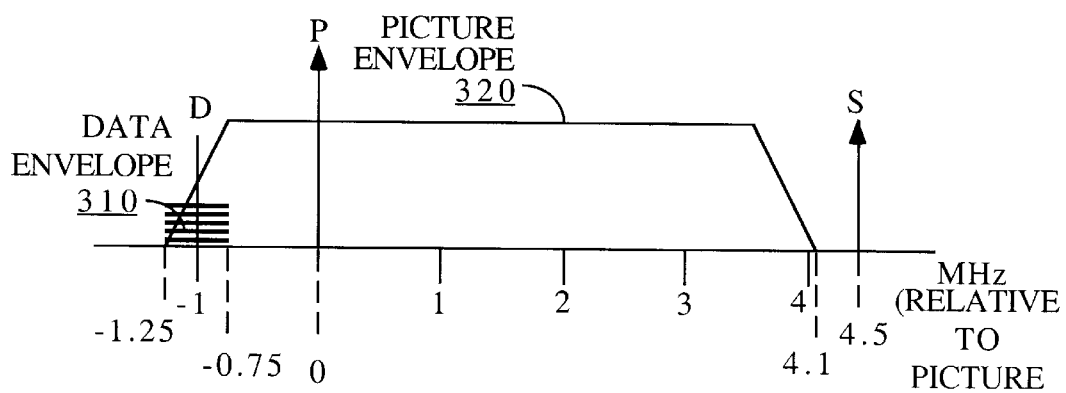
FIG. 3 is a spectral diagram of a television signal having a data carrier located within a vestigial sideband region.

FIG. 3 is a spectral diagram of a television signal having a data carrier located within a vestigial sideband region. Specifically, FIG. 3 depicts the relative spectral characteristics of a baseband video signal including a picture carrier P, a sound carrier S having a frequency 4.5 MHz above the picture carrier frequency, and a data carrier D having a frequency 1.0 MHz below the picture carrier frequency. Data, which has been modulated onto the data carrier D, occupies the shaded spectral region denoted as DATA ENVELOPE 310. Picture information, which has been modulated onto the picture carrier, occupies the delineated spectral region denoted as PICTURE ENVELOPE 320. In the exemplary embodiments of the invention (discussed below), data has been modulated onto the data carrier using a quadrature phase shift key (QPSK) modulation technique. Since the data modulation technique employed is not critical to the invention, other modulation techniques may be used instead of the exemplary QPSK technique. The baseband television signal depicted in FIG. 3 is modulated onto a radio frequency (RF) carrier and transmitted by a transmitter in a known manner.

Figure 1:
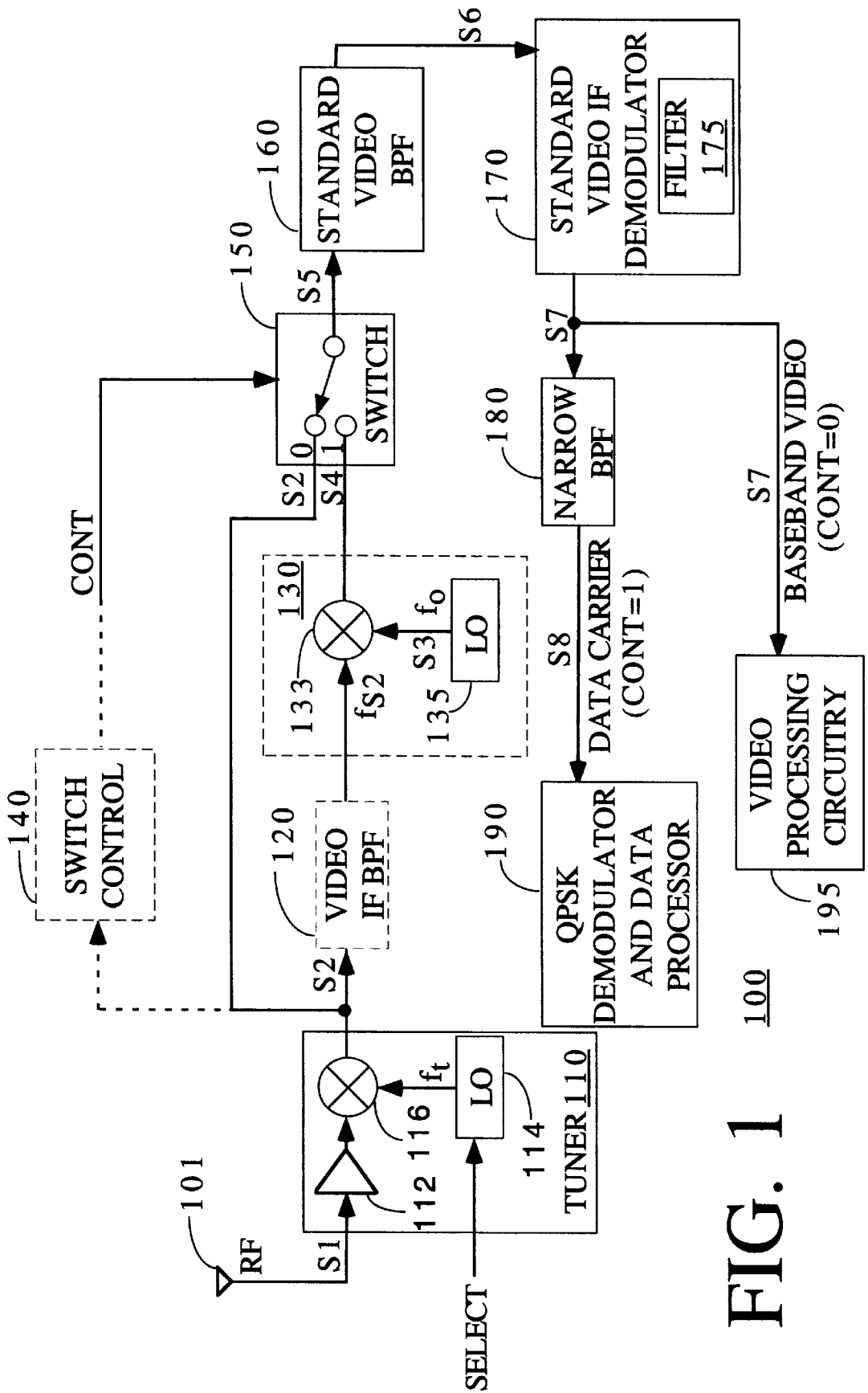
FIG. 1 is a block diagram of a receiver apparatus according to the invention for decoding a television signal having a data carrier located within a vestigial sideband region.

FIG. 1 is a block diagram of an receiver apparatus according to the invention for decoding a television signal having a data carrier located within a vestigial sideband region. A radio frequency (RF) television signal is received by an antenna 101 and coupled to a tuner 110 as RF signal S1. Tuner 110 selects one of a plurality of available television channels, and down-converts the selected television channel to produce a standard video intermediate frequency (IF) output signal S2. Tuner 110 may be implemented in a known manner. Illustratively, tuner 110 includes an RF amplifier 112 for amplifying RF signal S1 and a mixer 116 for mixing the amplified RF signal with a tuner oscillation signal $f_t$ to produce video IF signal S2. Tuner oscillation signal $f_t$ is produced by a local oscillator 114 which is responsive to a channel selection control signal SELECT.

Figure 4:
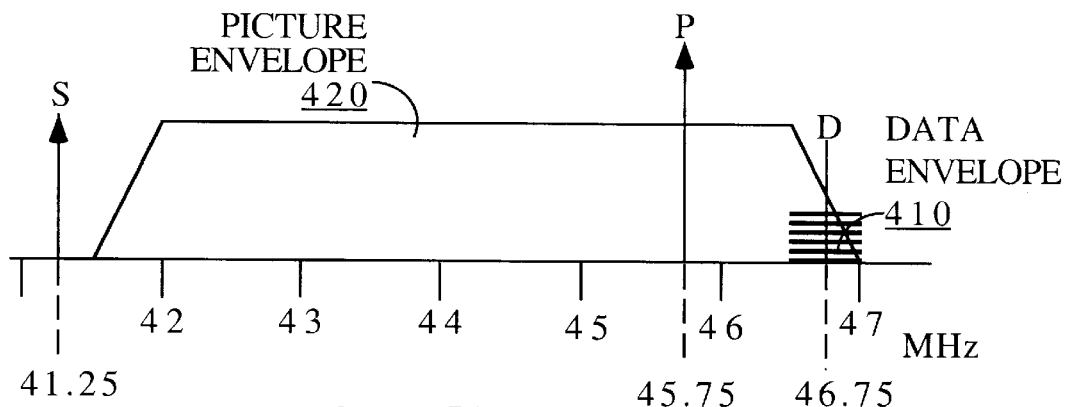
FIG. 4 is a spectral diagram useful in understanding the operation of the apparatus of FIG. 1 and FIG. 2.

FIG. 4 depicts the spectral characteristics of video IF signal S2. It should be noted that the relative spectral characteristics of the baseband television signal of FIG. 3 have been inverted by the operation of tuner 110. Specifically, video IF signal S2 comprises a picture carrier P at 45.75 MHz, a sound carrier S having a frequency 4.5 MHz below the picture carrier frequency (i.e., at 41.25 MHz), and a data carrier D having a frequency 1.0 MHz above the picture carrier frequency (i.e., at 46.75 MHz).

In a first (i.e., video) mode of operation, a switch 150, in response to a control signal (CONT=0), couples video IF signal S2 to a standard video band pass filter (BPF) 160 as a signal S5. Video BPF 160 may be an off-the-shelf surface acoustic wave (SAW) filter having a center frequency of 45.75 MHz and a Nyquist slope. BPF 160 rejects out-of-band spectral components, such as image frequencies caused by tuner 110. The output signal from BPF 160 (i.e., signal S6) is coupled to a standard (e.g., off-the-shelf) video IF demodulator 170. Video IF demodulator 170 demodulates the band pass filtered signal S6 to produce a baseband signal S7. In the first mode of operation the baseband signal S7 comprises a video baseband signal which is processed by video processing circuitry 195 for, e.g., subsequent display on a display device (not shown).

In a second (i.e., data) mode of operation, video IF signal S2 is coupled to a spectral inverter 130 comprising a mixer 133 and an oscillator 135. The spectral inverter produces an output signal S4 comprising at least a spectrally inverted version of the video IF signal S2. The spectral inverter 130 includes an oscillator 135 for producing an oscillation signal S3 (having a frequency $f_0$) which is coupled to a first input of the mixer 133. It should be noted that oscillator 135 may be a stand-alone type of oscillator or an oscillation signal source, such as a frequency converter utilizing the local oscillator 114. The video IF signal S2 (having a group of frequencies $F_{S2}$) is coupled to a second input of the mixer 133. Mixer 133 mixes the video IF signal with the oscillation signal S3 to produce an output signal S4. The oscillation frequency $f_0$ is greater than the IF frequencies $f_{S2}$ of interest in video IF signal S2. Thus, mixer output signal S4 includes an $f_0-f_{S2}$ group of frequencies and an $f_0+f_{S2}$ image group of frequencies. The $f_0-f_{S2}$ group of frequencies represents a spectrally inverted version of the video IF signal S2.

In the case of an NTSC signal, the oscillation frequency $f_0$ is selected to be 91.5 MHz. Thus, the $f_0-f_{S2}$ group of frequencies in output signal S4 will remain within the frequency range of a standard NTSC video IF signal (i.e., approximately 41 MHz to 47 MHz). Other IF frequencies may be inverted and located within the standard NTSC video IF range by selecting a different oscillation frequency $f_0$. For example, if tuner 110 produced an IF video signal S2 having a picture carrier frequency of 37 MHz, the oscillation frequency would be 45.75 plus 37 MHz (i.e., 82.75 M Hz).

An important effect of mixer 133 is shifting the data carrier frequency from 46.75 MHz to 44.75 MHz (i.e., 91.5 MHz–46.75 MHz=44.75 MHz). It should be noted that the IF bandwidth for a luminance signal is approximately 3 MHz, from 45.75 MHz to 42.75 MHz. Thus, spectral inverter 130 causes the data carrier to be spectrally located in a frequency region normally associated with a luminance portion of the video signal. In this manner, the data carrier is placed within a spectral region normally passed by a standard video IF filter, such as BPF 160.

Figure 5:
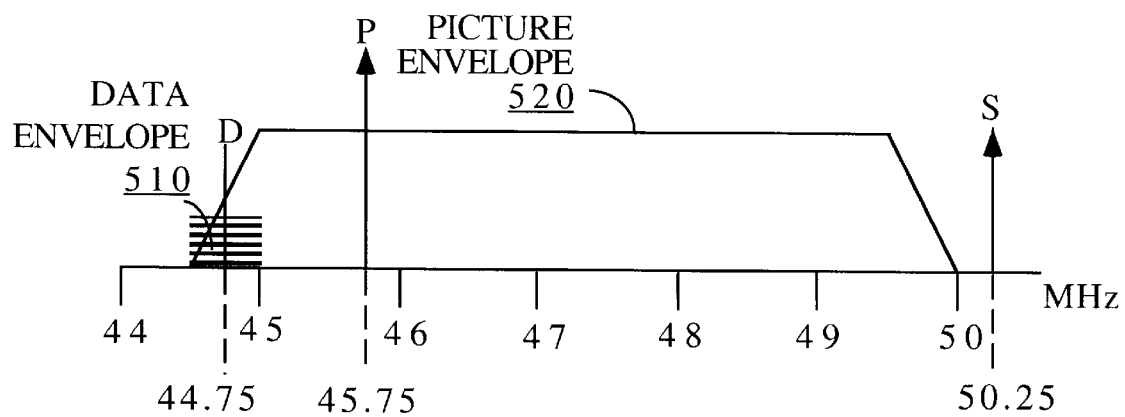
FIG. 5 is a spectral diagram useful in understanding the operation of the apparatus of FIG. 1 and FIG. 2.

FIG. 5 depicts a portion of the spectral characteristics of mixer output signal S4, specifically the spectral components below $f_0$ (i.e., the image components $f_0+f_{S2}$ are not shown). Note that the picture carrier is still at 45.75 MHz (i.e., 91.5 MHz–45.75 MHz =45.75 MHz), while the sound carrier has been shifted from 41.25 MHz to 50.25 MHz (i.e., 91.5 MHz–41.25 MHz =50.25 MHz).

An optional band pass filter 120 (e.g., a SAW filter having a 44 MHz center frequency and 6 MHz bandwidth) may be used to reject any out-ofband spectral information present in video IF signal S2, such as the image components $f_0+f_{S2}$. BPF 120 also removes any frequencies which may have been injected into the spectra of interest by the spectral inverter 130. For example, video IF signal S2 may include undesirable side frequencies, or other frequencies such as reflected or sub-multiple frequencies due to, e.g., sound or color information.

Switch 150, in response to the control signal (CONT=1), couples mixer output signal S4 to the standard video BPF 160 as signal S5. As previously discussed, BPF 160 is a standard video IF filter, illustratively a SAW filter, having a Nyquist slope at 45.75 MHz. This type of filter typically passes the complete video spectrum, relative to the IF picture frequency, of +0.75 MHz to –4.1 MHz. However, since the spectral inverter 130 has inverted the video spectrum, only a portion of the video spectrum will be passed by the standard video BPF 160.

Figure 6:
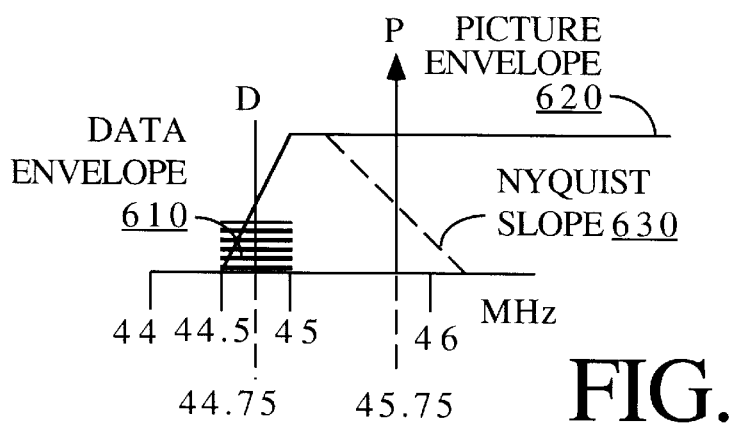
FIG. 6 is a spectral diagram useful in understanding the operation of the apparatus of FIG. 1 and FIG. 2.

FIG. 6 depicts the response of BPF 160 superimposed over a portion of the spectrum of mixer output signal S4, as depicted in FIG. 5. BPF 160 fully attenuated all frequencies above approximately 46.25 MHz, including, of course, the 91.5 plus 45.75 MHz image components caused by mixer 133 and the majority of the inverted video spectrum, to produce a band pass filtered signal S6. Thus, BPF 160 is used to reject the majority of non-data spectral components contained in signal S5.

Video IF demodulator 170 demodulates the band pass filtered signal S6 to produce a baseband signal S7. The data carrier D, which is in the normal video signal band of IF signal S6, appears in the baseband signal S7 at around 1 MHz. The actual bandwidth occupied by the data signal is from approximately 1.0 minus 0.25 MHz to 1.0 plus 0.25 MHz. It must be noted that in the second mode of operation, baseband signal S7 is not suitable for use by video processing circuitry 195.

Baseband signal S7 is filtered by a narrow band pass filter 180, illustratively a BPF having a center frequency of 1.0 MHz and a bandwidth of 0.4 MHz. The BPF 180 preserves the data carrier D while removing other signals, such as residual video, from baseband signal S7. The output of narrow band pass filter 180 (i.e., signal S8) is presented to a data utilization circuit, illustratively a QPSK data demodulator and data processor 190.

An switch control circuit 140 may be used to produce the control signal CONT used to control switch 150. Switch control circuit 140 receives the video IF signal S2 and determines if a data carrier is present in the VSB region of video IF signal S2. This determination may be made by examining the spectral symmetry of the upper and lower VSB regions. If the regions are symmetrical, then the lower VSB region likely includes only luminance information. If the regions are not symmetrical, then the lower VSB region may include a data carrier. If the switch control circuit 140 does not detect a data carrier, then the control signal CONT is set to "0" (i.e., video mode). If the switch control circuit 140 does detect a data carrier, then the control signal CONT is set to "1" (i.e., data mode). In addition to this automatic control method, a manual or computer-controlled method of switching between the data and video modes may be implemented.

An intercarrier type of demodulator, which is commonly used as an NTSC demodulator, is preferable to a direct frequency down conversion of the data carrier using an external local oscillator. An intercarrier demodulator demodulates one carrier (e.g., data) by referencing another carrier (e.g., picture), and typically requires only a single section filter 175. Moreover, the use of an intercarrier demodulator provides inherent compensation for carrier noise introduced by the tuner 210. For example, standard tuners inject up to 50 kHz of frequency noise into the tuned signal. However, since the injected noise affect the picture carrier and the data carrier in roughly the same manner, the intercarrier type of detector compensates for the injected noise. Other types of demodulators may also work, but result in varying degrees of phase noise at the output. The parameters of filter section 175 should be adjusted so that the combined filter response of the filter section 175 and the other filters in the loop (i.e., optional BPF 120, standard BPF 160) is nearly constant around the IF picture carrier frequency (i.e., 45.75 MHz for NTSC). In this manner, phase errors introduced to the picture carrier will be minimized. Advantageously, by using the intercarrier type of demodulator the frequency error of the demodulated QPSK signal (i.e., data carrier), a lower cost QPSK demodulator (290) may be used.

Figure 2:
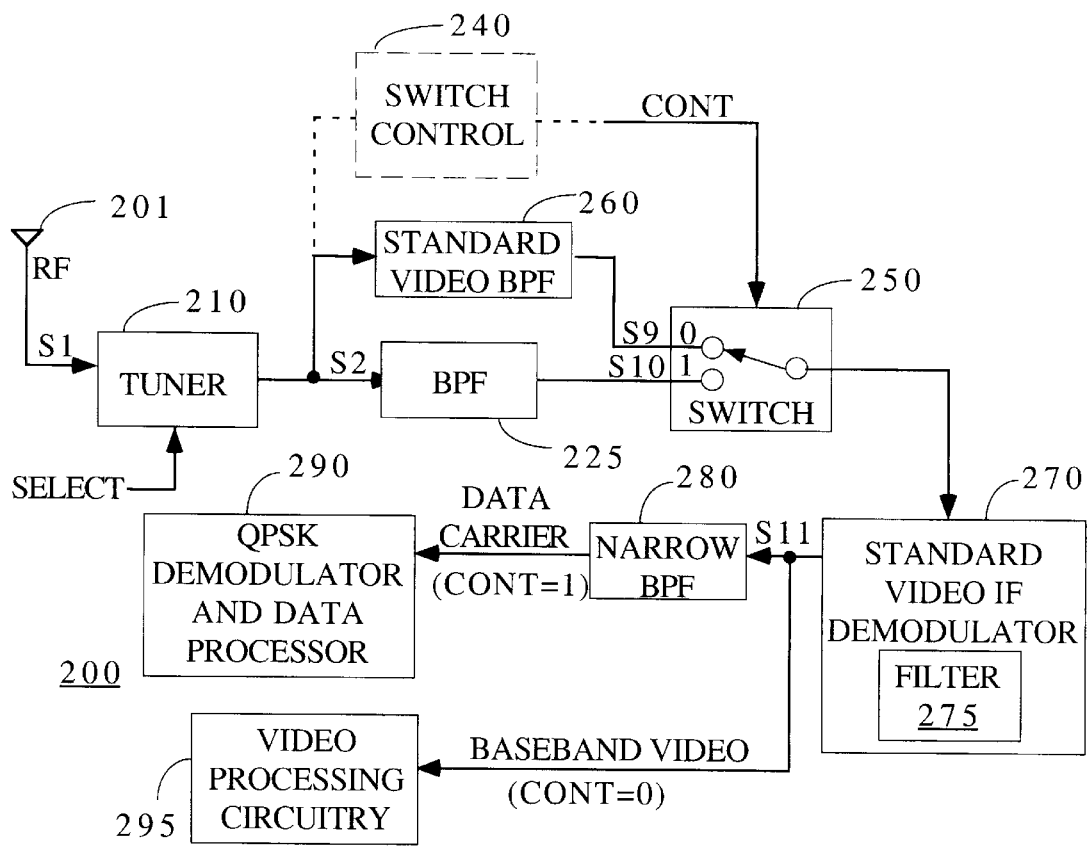
FIG. 2 is a block diagram of an alternative receiver apparatus according to the invention for decoding a television signal having a data carrier located within a vestigial sideband region.

FIG. 2 is a block diagram of an alternative receiver apparatus 200 according to the invention for decoding a television signal having a data carrier located within a vestigial sideband region. The receiver 200 of FIG. 2 utilizes most of the function blocks of the receiver of FIG. 1. For example, antenna 210, tuner 210, switch control 240, switch 250, video IF demodulator 270, narrow BPF 280, QPSK demodulator 290 and video processor 295 work in substantially the same manner as, respectively, antenna 110, tuner 110, switch control 140, switch 150, video IF demodulator 170, narrow BPF 180, QPSK demodulator 190 and video processor 195. As such, these function blocks of FIG. 2 will not be discussed in detail. In addition, signals S1, S2, SELECT and CONT are the same for both embodiments of the invention.

Video IF signal S2 is coupled to a standard video IF band pass filter 260 and a non-standard band pass filter 225. BPF 260, illustratively a standard video SAW filter, operates to reject any out-of-band components in video IF signal S2 caused by, e.g., tuner 210. Video BPF 260 may be an off-the-shelf surface acoustic wave (SAW) filter having a center frequency of 45.75 MHz and a Nyquist slope. The output signal from video BPF 260 (i.e., signal S9) is coupled to an input of switch 250.

Non-standard BPF 225 preserves the picture carrier and the data signal, but attenuates all other spectral components. Specifically, a filter operating as non-standard BPF 225 must pass the picture carrier P and the data carrier D, while rejecting luminance components more than 750 kHz above or below the picture carrier P. This type of transfer function is required to ensure proper operation of the standard video IF demodulator 270.

Figure 7:
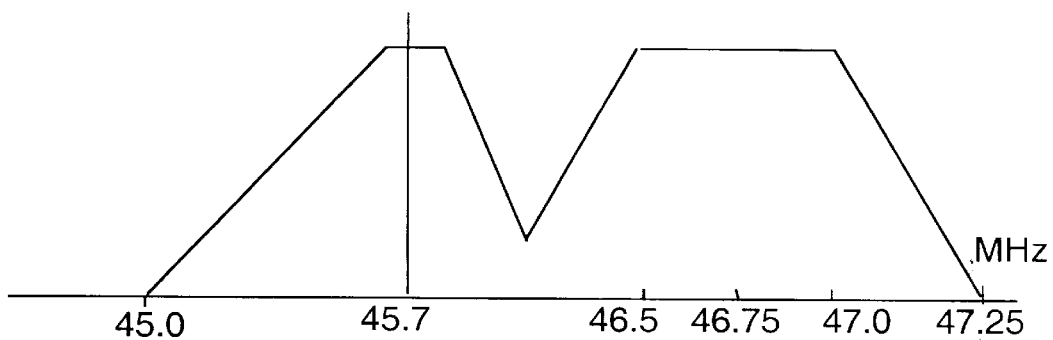
FIGS. 7–9 depict frequency response curves of a filter suitable for use in the apparatus of FIG. 1.
Figure 8:
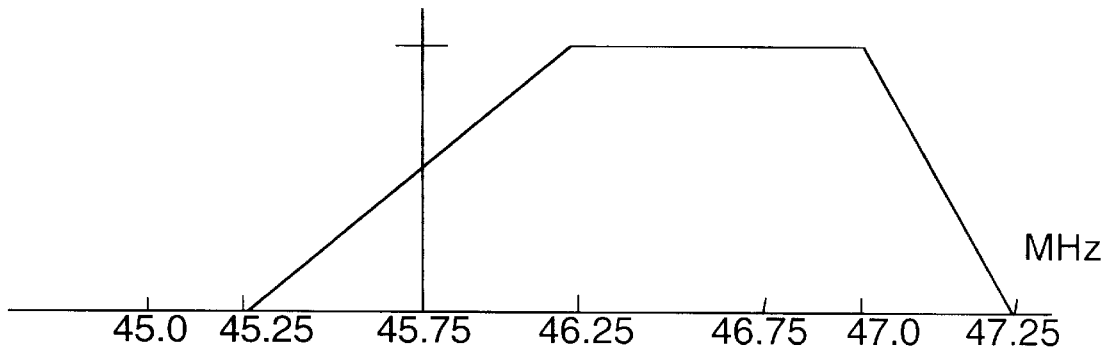
Figure 9:
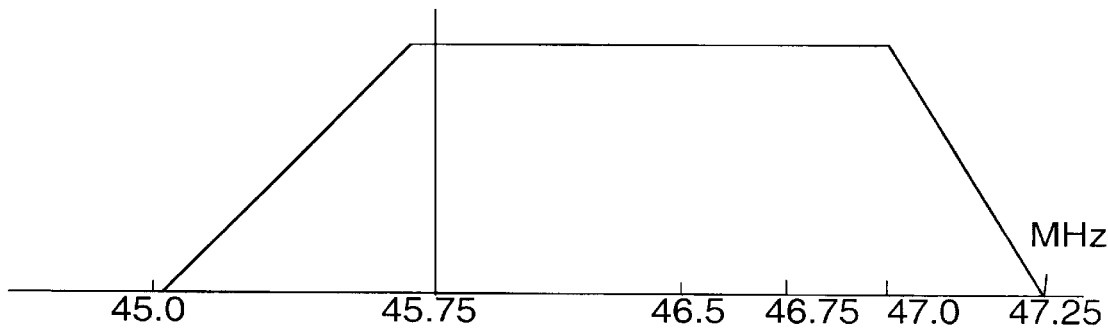

FIGS. 7–9 depict frequency response curves of a filter suitable for use as narrow BPF 225. It should be noted in each of the frequency response curves shown in FIGS. 7–9, the luminance signal is filtered such that there are no luminance signal spectral components beyond +0.75 or −0.75 MHz relative to the picture carrier frequency.

The frequency response curve of a filter 225 shown in FIG. 7 is a superposition of two bandpass frequency response curves, one around the picture carrier and the other around the data carrier. The standard video IF demodulator 270 then performs intercarrier demodulation between the picture carrier and the data signal resulting in the generation of the data signal at the output at 1.0 MHz frequency.

The frequency response curve of a filter 225 shown in FIG. 8 has a pass-band characteristic for the data signal, and a Nyquist slope for the picture carrier. The Nyquist slope allows generation of a picture carrier in the standard video IF demodulator 270 substantially free of phase noise, which is then used for intercarrier demodulation of the data signal.

The frequency response curve of a filter 225 shown in FIG. 9 has a pass-band characteristic for the picture carrier and the data signal. A narrow symmetrical frequency region is created around the picture carrier by such a filter and the filter 275, resulting in the generation of a picture carrier in the standard video IF demodulator 270 substantially free of phase noise, which is then used for intercarrier demodulation of the data signal.

In a first (i.e., video) mode of operation, switch 250, in response to a control signal (CONT=0), couples video band pass filtered signal S9 to a standard (e.g., off-the-shelf) video IF demodulator 270. Video IF demodulator 270 demodulates video band pass filtered signal S9 to produce a baseband signal S11. The baseband signal S11 is coupled to QPSK demodulator 190 and processing circuitry 295. In the first mode of operation, the baseband signal S11 comprises a video baseband signal which is processed by video processing circuitry 195 for, e.g., subsequent display on a display device (not shown). QPSK demodulator 290 is not used in the first mode of operation.

In a second (i.e., data) mode of operation, switch 150, in response to a control signal (CONT=1), couples narrow band pass filtered signal S10 to a standard (e.g., off-the-shelf) video IF demodulator 270. Video IF demodulator 170 demodulates narrow band pass filtered signal S10 to produce baseband signal S11. In the second mode of operation, the baseband signal S11 comprises the data carrier and any data modulated onto the data carrier. The baseband signal S11 is then utilized by, illustratively, narrow BPF 180. Video processing circuitry 195 is not used in the second mode of operation.

The above-described television receiver 100 of FIG. 1 provides data demodulation functionality to a standard television receiver by adding a minimal amount of hardware. Specifically, the additional required components are the spectral inverter 130 and the switch 150. The narrow BPF 180 is necessary if the data utilization circuit (i.e., QPSK demodulator and data processor 190) does not include a front-end filter for rejecting non-data frequencies.

The above-described television receiver 200 of FIG. 2 also provides data demodulation functionality to a television receiver by adding a minimal amount of hardware. Specifically, the additional required components are the non-standard BPF 225 and the switch 250. Thus, the television receiver 200 of FIG. 2 uses an non-standard IF filter followed by a standard video demodulator for the recovery of the data carrier.

It should be noted that the receiver 100 of FIG. 1 and the receiver 200 of FIG. 2 may be modified by adding an additional video IF demodulator to allow simultaneous demodulation of video and data baseband information. In a receiver including an additional video demodulator there is no need for a switch 150, 250 to select an operating mode. Rather, in either case, the video IF signal S2 is coupled through a video IF BPF and a video demodulator to produce a video baseband signal. Similarly, the spectrally inverted signal S4 (of FIG. 1) and the narrow band-pass filtered signal S10 (of FIG. 2) are coupled to respective demodulators that responsively produce baseband data signals.

Although various embodiments which incorporate the teachings of the present invention have been shown and described in detail herein, those skilled in the art can readily devise many other varied embodiments that still incorporate these teachings.

What is claimed is:

1. In a television receiver, apparatus for recovering a data carrier signal included within a vestigial sideband of a television signal, said apparatus comprising:

a spectral inverter, responsive to said television signal, for producing a spectrally inverted television signal, said spectrally inverted television signal including said data carrier signal in a spectral region normally associated with luminance information;

a demodulator, coupled to said spectral inverter, for demodulating said spectrally inverted television signal to produce a baseband signal, said baseband signal including said data carrier signal; and a switch, having a first input receiving said television signal, and a second input coupled to an output of said spectral inverter, for selectively coupling said television signal or said spectrally inverted television signal to said demodulator.

2. The apparatus of claim 1, further comprising:

a narrow band pass filter, coupled to said demodulator, for removing video frequencies from said baseband signal.

3. The apparatus of claim 1, wherein said spectral inverter comprises:

an oscillator, for producing an oscillation signal, said oscillation signal having a higher frequency than said television signal; and a mixer, coupled to said oscillator, for mixing said television signal and said oscillation signal to produce an output signal including a difference signal, said difference signal comprising said spectrally inverted television signal.

4. The apparatus of claim 1, further comprising:

a switch control circuit, coupled to receive said television signal, for determining if a data carrier signal is included within said television signal and for producing a control signal indicative of the inclusion of said data carrier therein;

said switch, in response to said control signal indicating that said data carrier is included within said television signal, coupling said spectrally inverted television signal to said demodulator; and said switch, in response to said control signal indicating that said data carrier is not included within said television signal, coupling said television signal to said demodulator.

5. The apparatus of claim 1, wherein said television signal comprises a standard intermediate frequency (IF) television signal, said apparatus further comprising:

a standard IF bandpass filter.

6. The apparatus of claim 2, wherein:

said demodulator comprises an intercarrier type of demodulator.

7. The apparatus of claim 3, wherein said television signal comprises a standard intermediate frequency (IF) television signal, said apparatus further comprising:

a standard IF bandpass filter.

8. The apparatus of claim 7, wherein said local oscillator frequency is selected to spectrally locate said data carrier in said difference signal within a passband of said standard IF bandpass filter.

9. In a television receiver, apparatus for retrieving a carrier signal included within a vestigial sideband of a television signal, said apparatus comprising:

a first filter, coupled to receive said television signal, for passing a band of frequencies associated with said vestigial sideband of said television signal as a first signal;

a second filter, coupled to receive said television signal, for passing a band of frequencies associated with a video portion of said television signal as a second signal;

a switch, coupled to said first and second filters, for selectively coupling one of said first and second signals to an output; and a demodulator, coupled to said switch, for demodulating said signal coupled to said switch output to produce a baseband signal.

10. The apparatus of claim 9, further including:

a switch control circuit, coupled to receive said television signal, for determining if a data carrier signal is included within said television signal and for producing a control signal indicative of the inclusion of said data carrier therein;

said switch, in response to said control signal indicating that said data carrier is included within said television signal, coupling said first signal to said output; and said switch, in response to said control signal indicating that said data carrier is not included within said television signal, coupling said second signal to said output.

11. A method for recovering a data carrier signal included within a vestigial sideband of a television signal, said method comprising the steps of:

inverting the spectrum of said television signal to frequency translate said data carrier signal from a spectral region associated with said vestigial sideband to a spectral region normally associated with luminance information; demodulating, using a standard video demodulator, said spectrally inverted television signal to produce a baseband signal, said baseband signal including said data carrier signal in a spectral region normally associated with luminance information; and selectively coupling, using a switch, said television signal or said spectrally inverted television signal to said demodulator.

12. The method of claim 11, wherein said step of selectively coupling comprises the steps of:

determining if a data carrier signal is included within said television signal;

producing a control signal indicative of the inclusion of said data carrier within said television signal;

coupling said spectrally inverted television signal to said demodulator in response to said control signal indicating that said data carrier is included within said television signal; and coupling said television signal to said demodulator in response to said control signal indicating that said data carrier is not included within said television signal.

13. The method of claim 11, further comprising the step of:

filtering said baseband output signal from said demodulator to remove video information.

14. The method of claim 11, wherein said spectral inverting step comprises the steps of:

generating an oscillation signal having a higher frequency than said television signal; and mixing said television signal and said oscillation signal to produce an output signal including a difference signal, said difference signal comprising said spectrally inverted television signal.

15. The method of claim 11, wherein said television signal comprises a standard intermediate frequency (IF) television signal, said method further comprising the step of:

filtering said IF television signal using a standard IF bandpass filter.

16. The method of claim 14, wherein said television signal comprises a standard intermediate frequency (IF) television signal, said method further comprising the step of:

filtering said IF television signal using a standard IF bandpass filter.

17. The apparatus of claim 16, wherein said oscillator frequency is selected to spectrally locate said data carrier in said difference signal within a passband of said standard IF bandpass filter.

* * * * *